(12) United States Patent
Kano et al.

(10) Patent No.: US 10,120,485 B2
(45) Date of Patent: Nov. 6, 2018

(54) ELECTRONIC DEVICE AND OPERATION INPUT PROGRAM

(71) Applicant: Murata Manufacturing Co., Ltd., Nagaokakyo-shi, Kyoto-fu (JP)

(72) Inventors: Hidekazu Kano, Nagaokakyo (JP); Hiroaki Kitada, Nagaokakyo (JP); Takafumi Inoue, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 257 days.

(21) Appl. No.: 15/095,555

(22) Filed: Apr. 11, 2016

(65) Prior Publication Data

US 2016/0224182 A1 Aug. 4, 2016

Related U.S. Application Data

(63) Continuation of application No. PCT/JP2014/077898, filed on Oct. 21, 2014.

(30) Foreign Application Priority Data

Oct. 25, 2013 (JP) .................................. 2013-222491

(51) Int. Cl.
*G06F 3/041* (2006.01)
*G06F 3/044* (2006.01)
(Continued)

(52) U.S. Cl.
CPC ............ *G06F 3/0416* (2013.01); *G06F 3/044* (2013.01); *G06F 3/0414* (2013.01);
(Continued)

(58) Field of Classification Search
CPC ......... G06F 3/016; G06F 3/017; G06F 1/1641
(Continued)

(56) References Cited

U.S. PATENT DOCUMENTS 9,606,574 B2 * 3/2017 Park .......................... G06F 1/16
2010/0110031 A1 5/2010 Miyazawa et al.
(Continued)

FOREIGN PATENT DOCUMENTS

JP 2002135369 A 6/2002
JP 2006121571 A 5/2006
(Continued)

OTHER PUBLICATIONS

International Search Report issued for PCT/JP2014/077898, dated Dec. 16, 2014.
(Continued)

*Primary Examiner* — Calvin C Ma
(74) *Attorney, Agent, or Firm* — Arent Fox LLP

(57) ABSTRACT

An electronic device that provides a number of function modes and operates by selecting one of the function modes. The device includes an audio output unit and a wireless communication unit that execute functions for the function modes. Moreover, a deformation detecting unit that detects deformation of an exterior housing by an external force and a storage unit that stores a correspondence between a deformation pattern and a response operation registered per function mode. The device also includes an operation determining unit that detects the deformation pattern based on the deformation and a control executing unit that reads a response operation of a current function mode associated with the deformation pattern and controls operation states of the audio output unit and the wireless communication unit.

20 Claims, 8 Drawing Sheets

(51) Int. Cl.
*G06F 3/0487* (2013.01)
*H04M 1/02* (2006.01)

(52) U.S. Cl.
CPC .. *G06F 3/0487* (2013.01); *G06F 2203/04102* (2013.01); *G06F 2203/04105* (2013.01); *H04M 1/0206* (2013.01)

(58) Field of Classification Search
USPC .................................. 345/156–157, 173–174
See application file for complete search history.

(56) References Cited

U.S. PATENT DOCUMENTS

| | | | | |
|---|---|---|---|---|
| 2012/0025674 | A1* | 2/2012 | Yoshida | C08G 63/08 310/365 |
| 2013/0080941 | A1* | 3/2013 | Reeves | G06F 3/0482 715/761 |
| 2014/0320393 | A1* | 10/2014 | Modarres | G06F 3/017 345/156 |
| 2014/0331791 | A1 | 11/2014 | Ishii et al. | |
| 2014/0339724 | A1 | 11/2014 | Yoshida et al. | |

FOREIGN PATENT DOCUMENTS

| | | |
|---|---|---|
| JP | 2009129248 A | 6/2009 |
| JP | 2010108273 A | 5/2010 |
| JP | 2012235086 A | 11/2012 |
| JP | 2013118700 A | 6/2013 |
| JP | 2013198072 A | 9/2013 |
| WO | WO 2013111841 A1 | 12/2015 |

OTHER PUBLICATIONS

Written Opinion of the International Searching Authority issued for PCT/JP2014/077898, dated Dec. 16, 2014.

* cited by examiner

|  | COMMUNICATION CONTROL MODE | MUSIC CONTROL MODE | ... |
|---|---|---|---|
| CLICK PATTERN | RESPONSE OPERATION 1-A | RESPONSE OPERATION 2-A | ... |
| LONG-TIME PUSH PATTERN | RESPONSE OPERATION 1-B | RESPONSE OPERATION 2-B | ... |
| DOUBLE CLICK PATTERN | RESPONSE OPERATION 1-C | RESPONSE OPERATION 2-C | ... |
| ... | ... | ... | ... |

//  # ELECTRONIC DEVICE AND OPERATION INPUT PROGRAM

CROSS-REFERENCE TO RELATED APPLICATIONS

The present application is a continuation of PCT/JP2014/077898 filed Oct. 21, 2014, which claims priority to Japanese Patent Application No. 2013-222491, filed Oct. 25, 2013, the entire contents of each of which are incorporated herein by reference.

TECHNICAL FIELD

The present invention relates to an electronic device that performs a response operation corresponding to a user's operation, and an operation input program.

BACKGROUND

General electronic devices accept users' operations via mechanical key input units or touch panels. Upon an operation of such an electronic device, each user needs to operate a key input unit or a touch panel while checking an operation position of the key input unit or an indication of the touch panel to reliably operate the electronic device as intended. Hence, in some cases, each user takes a time to operate an electronic device or makes an operation mistake when each user needs to suddenly operate the electronic device or when each user operates the electronic device with the electronic device in a pocket or a bag.

Therefore, operation input methods of electronic devices that make it unnecessary to check an operation position have been proposed (see, for example, Patent Literatures 1 to 3). For example, according to operation input methods disclosed in Patent Literatures 1 and 2, an angular velocity sensor or an acceleration sensor is provided to each electronic device to detect an operation of tapping or shaking each electronic device. Further, according to an operation input method disclosed in Patent Literature 3, a touch screen is provided to an electronic device to detect relative motions of a plurality of fingers at arbitrary positions on the touch screen.

PTL 1: Japanese Patent Application Laid-Open No. 2009-129248.
PTL 2: Japanese Patent Application Laid-Open No. 2013-118700.
PTL 3: Japanese Patent Application Laid-Open No. 2010-108273.

However, according to the operation input methods disclosed in Patent Literatures 1 and 2, it is difficult to distinguish between an acceleration and an angular velocity produced by a user's intentional operation, and an acceleration and an angular velocity produced by a motion of an electronic device which is not intended by a user, and it is difficult to accurately detect a user's operation.

Further, according to the operation input method disclosed in Patent Literature 3, when, for example, a user tries to operate the touch screen while gripping an electronic device by one hand, the user needs to grip the electronic device by an irregular shape of a hand to place a plurality of fingers in contact with the touch screen. Therefore, user's operability for operating the touch screen by a plurality of fingers has been poor.

SUMMARY OF INVENTION

It is therefore an object of the present invention to provide an electronic device that, even when a user operates the electronic device without checking an operation position, can accurately detect the user's operation, and which has good operability, and an operation input program.

Accordingly, an electronic device is disclosed that has a plurality of function modes and operates by selecting one of the function modes. The device includes a function unit which executes a function corresponding to the selected function mode; an exterior housing that is deformed when receiving an external force; a deformation detecting unit which detects the deformation of the exterior; a storage unit in which a correspondence relationship between a deformation pattern of the exterior and a response operation is registered per function mode; an operation determining unit which detects the deformation pattern of the exterior registered in the storage unit, based on the deformation of the exterior detected by the deformation detecting unit; and a control executing unit which reads from the storage unit the response operation associated with the deformation pattern and the selected function mode when the deformation pattern is detected, and controls an operation state of the function unit.

According to the configuration, the deformation detecting unit and the operation determining unit detect that the exterior housing is deformed according to the predetermined pattern by an external force applied from a user, and the control executing unit controls the function unit to perform a response operation corresponding to this operation pattern. The user can operate the electronic device by applying the external force to an arbitrary position of the exterior housing, and deforming the exterior housing without checking an operation position. Even though the exterior housing is deformed by the external force intentionally applied from the user, the exterior housing is not deformed by the acceleration or the angular velocity. Consequently, it is possible to accurately detect a user's operation. Further, when the user operates the electronic device, the number of fingers and a shape of the hand which operate the exterior housing are not limited, so that operability is good.

Preferably, the deformation detecting unit is activated from the pause state when the function unit enters a predetermined operation state. Preferably, for example, the function unit includes a touch operation detecting unit which detects a touch operation of a user with respect to the operation surface which is part of an outer surface included in the exterior housing, and the deformation detecting unit enters an activation state from a pause state when the touch operation detecting unit enters a pause state. In this case, preferably, the touch operation detecting unit enters the pause state after a certain period of time passes after the touch operation of the user with respect to the operation surface is detected. Further, for example, the plurality of function modes may include a communication control mode, the function unit may include a wireless communication unit which performs wireless communication in the communication control mode, and the deformation detecting unit may enter the activation state from the pause state when the wireless communication unit receives a wireless signal. Thus, by optionally switching the deformation detecting unit and the touch operation detecting unit between the pause state and the activation state, it is possible to further enhance user's operability.

Preferably, the deformation detecting unit includes a piezoelectric film which deforms in response to a user's push on the exterior. Particularly, the piezoelectric film is preferably made of a chiral polymer. According to this configuration, the user can perform an operation by pushing the exterior by the finger. Further, the piezoelectric film whose main material is chiral polymers can obtain an output without an influence of pyroelectricity, i.e., can obtain an output without an influence of a change in a temperature at an operation position. Consequently, it is possible to precisely detect the deformation of the exterior without an influence of heat transfer from the fingers or an influence of generation of heat inside the electronic device.

Preferably, the exterior housing has a rectangular flat shape, and the deformation detecting unit detects deformation of each of two opposing outer surfaces of the exterior housing. According to this configuration, by deforming one outer surface of the exterior without checking a top and a back of the two opposing outer surfaces of the exterior housing, the user can operate the electronic device. Consequently, the user can cut the need to check the top and the back of the exterior.

According to an exemplary embodiment, an operation input program is disclosed that is executed by an electronic device which includes a function unit which executes a function corresponding to a function mode selected from a plurality of function modes; an exterior housing that is deformed when receiving an external force; a deformation detecting unit which detects the deformation of the exterior housing; a storage unit in which a correspondence relationship between a deformation pattern of the exterior housing and a response operation of the function unit is registered per function mode, and the causes the electronic device to execute processing of detecting the deformation pattern of the exterior registered in the storage unit, based on the deformation detected by the deformation detecting unit, reading from the storage unit a response operation associated with the detected deformation pattern and a selected function mode when the deformation pattern is detected, and controlling the function unit. This operation input program can cause the electronic device to perform a response operation according to a user's operation of deforming the exterior.

According to the present invention, a user can operate an electronic device by applying an external force to an exterior housing of the electronic device, and deforming the exterior according to a predetermined pattern without checking an operation position.

DETAILED DESCRIPTION

An electronic device according to the first embodiment of the present invention will be described with reference to the drawings.

Figures 1A, 1B:
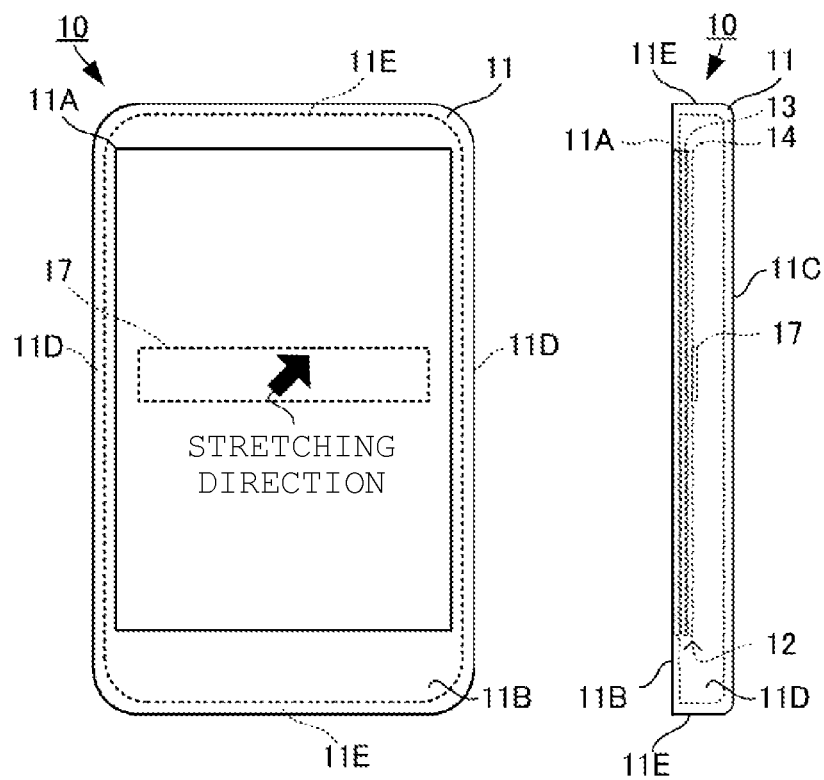
FIGS. 1(A) and 1(B) are a plan view and a side view of an electronic device according to a first embodiment of the present invention.

FIG. 1(A) is a plan view of the electronic device according to the first embodiment of the present invention.

FIG. 1(B) is a side view of the electronic device according to the first embodiment of the present invention.

An electronic device 10 according to the present embodiment is a smartphone terminal having a size which allows a user to grip, and includes various functions including a function of controlling music playback and a function of controlling voice communication.

The electronic device 10 includes an exterior housing (also referred to simply as an "exterior") and a touch panel 12. In addition, although not illustrated herein, the electronic device 10 includes other hardware components, too, such as a CPU, a storage unit, a wireless communication circuit, an image processing circuit, an audio processing circuit, a circuit substrate and the like which compose the smartphone terminal.

The exterior 11 has a rectangular flat shape whose length and width are larger than a thickness, and includes an internal space. The exterior 11 includes a cover glass 11A, a front plate 11B, a back plate 11C, a pair of side plates 11D and a pair of side plates 11E. The front plate 11B, the back plate 11C, the side plates 11D, and the side plates 11E are made of a general hard organic material such as ABS or PC, and are formed to be dividable at optional positions. The front plate 11B and the back plate 11C each have a rectangular shape seen from a front view (plan view), and the front plate 11B is provided with a rectangular opening to which the cover glass 11A is fitted. The cover glass 11A has translucency, and is fitted to the opening of the front plate 11B. A pair of side plates 11D are provided to extend along long sides of the front plate 11B and the back plate 11C, respectively. A pair of side plates 11E is provided to extend along short sides of the front plate 11B and the back plate 11C, respectively. A pair of the side plates 11D and a pair of side plates 11E are formed in shapes continuing along outer circumferences of the front plate 11B and the back plate 11C.

The touch panel 12 is pasted in a close contact state at a back side of the cover glass 11A and is stored inside the exterior 11 such that, when an arbitrary position of the cover glass 11A is pressed by a finger or the like, the touch panel 12 deforms together with the cover glass 11A. The touch panel 12 includes a capacitive sensor 13, a display unit 14 and a pressing sensor 17. In this regard, on the touch panel 12, the capacitive sensor 13, the display unit 14 and the pressing sensor 17 are disposed in order from the side of the cover glass 11A.

The capacitive sensor 13 comprises a structure where capacitive detecting electrodes are formed on both principal surfaces of a dielectric substrate, faces the cover glass 11A, and causes a local change in a capacitance when the user performs a touch operation on the cover glass 11A.

The display unit 14 includes a liquid crystal display panel or an organic EL display panel, and displays a drawn image on the cover glass 11A as a display surface.

The pressing sensor 17 comprise a structure where press detecting electrodes are formed on both surfaces of a piezoelectric film made of polyvinylidene fluoride (PVDF), poly-L-lactic acid (PLLA) or the like. This pressing sensor 17 is deformed together with the cover glass 11A when the user's finger presses the cover glass 11A to produce electric charges between the press detecting electrodes. In this regard, the pressing sensor 17 is arranged such that long sides seen from the front view go along short sides of the exterior 11 and short sides seen from the front view go along long sides of the exterior 11. In addition, the pressing sensor 17 may be arranged such that the long sides seen from the front view go along the long sides of the exterior 11 and the short sides seen from the front view go along the short sides of the exterior 11.

According to one embodiment, the pressing sensor 17 is formed by a piezoelectric film made of chiral polymers such as PLLA, and is stretched in a stretching direction indicated by a black arrow in FIG. 1(A). Chiral polymers such as PLLA have a main chain which adopts a spiral structure, and exhibits piezoelectricity when the chiral polymers are uniaxially stretched and molecules are oriented. More specifically, the chiral polymers exhibit piezoelectricity expressed by a piezoelectric tensor component $d_{14}$ when a thickness direction of the piezoelectric film is a first axis and a stretching direction of the piezoelectric film is a third axis. A relative permittivity of the PLLA is about 2.5 and very low, and therefore a piezoelectric output constant (=piezoelectric g constant) belongs to a group of high constants among polymers and can provide the same detection sensitivity as that of PVDF, for example.

Further, the piezoelectric film is formed in a band shape such that long sides extend in an angular direction (a direction of 45 degrees) intersecting the stretching direction indicated by a black arrow in FIG. 1(A). Thus, the piezoelectric film made of chiral polymers can detect deformation which deflects the piezoelectric film in a thickness direction instead of deformation which twists the piezoelectric film. Further, when the stretching direction of the piezoelectric film is arranged in parallel to a rim of an exterior, the piezoelectric film made of chiral polymers can detect deformation which twists the piezoelectric film.

In addition, the stretching ratio for the piezoelectric film made of chiral polymers is preferably about three to eight times. Applying heat processing after the stretching encourages crystallization of extended chain crystal of chiral polymers, and increases a piezoelectric constant. In addition, when a film is biaxially stretched, it is possible to provide the same effect as that of the uniaxial stretching by varying stretching ratios of respective axes. When, for example, a film is stretched eight times in a given direction serving as an X axis, and the film is stretched two times in a Y axis direction orthogonal to the X axis, it is possible to provide for a piezoelectric constant the substantially same effect as that obtained when the film is uniaxially stretched four times in the X axis direction. A simply uniaxially stretched piezoelectric film is likely to break along a stretching axis direction, and therefore it is possible to increase a strength to some degree by biaxially stretching the film as described above.

Further, the piezoelectric film made of chiral polymers produces piezoelectricity only by molecule orientation processing such as stretching, and does not need to be subjected to polling processing unlike other polymers such as PVDF or piezoelectric ceramics. That is, the piezoelectricity of chiral polymers which do not belong to ferroelectrics does not appear as a result of ion polarization unlike ferroelectrics such as PVDF and PZT, but derives from a spiral structure which is a characteristic structure of molecules. Hence, the chiral polymers do not produce pyroelectricity produced by other ferroelectric piezoelectric bodies. Consequently, it is possible to obtain an output without an influence of a temperature change at a detection position and to precisely detect deformation of an exterior without an influence of heat transfer from the fingers or an influence of generation of heat inside the exterior.

Further, the PVDF or the like shows a temporal fluctuation of a piezoelectric constant, and the piezoelectric constant remarkably lowers depending on cases. However, the piezoelectric constant of chiral polymers such as the PLLA is temporarily very stable. Furthermore, piezoelectric films made of PLLA and PVDF are polymers having flexibility, and therefore are not damaged by great deformation unlike piezoelectric ceramics. Consequently, even when deformation is great, it is possible to reliably detect a deformation amount.

In addition, the piezoelectric film made of chiral polymers is transparent, and therefore the pressing sensor 17 may be provided closer to the side of the cover glass 11A than the display unit 14. In this case, the press detecting electrodes provided on the both surfaces of the piezoelectric film are also preferably transparent. For the press detecting electrodes, it is suitable to use inorganic electrodes such as ITO, ZnO, carbon nanotubes and graphene, and organic electrodes whose main component is polythiophene and polyaniline. Further, the pressing sensor 17 (piezoelectric film) is preferably disposed on an entire display region of the display unit 14.

Figure 2A:
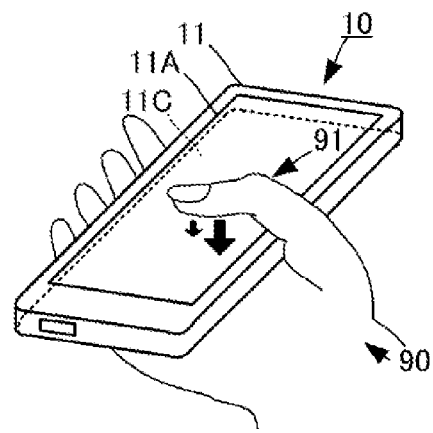
FIGS. 2(A) to 2(C) are schematic views for explaining a pressing operation of the electronic device according to the first embodiment of the present invention.

This electronic device 10 detects a user's touch operation with respect to the cover glass 11A, and detects a user's pressing operation with respect to the cover glass 11A and performs a corresponding response operation. FIG. 2(A) is a schematic view illustrating a situation in which the user presses the cover glass 11A.

The user performs the pressing operation on the electronic device 10 by gripping the exterior 11 by a hand 90 and pressing the cover glass 11A by a finger 91 of the hand 90. When the user performs the pressing operation on the electronic device 10, the number and positions of the fingers 91 which operate the exterior 11 (cover glass 11A), and a shape of the hand 90 which grips the electronic device 10 are not limited.

Consequently, it is possible to operate this electronic device 10 having better operability than that of a conventional technique without checking an operation position.

Figure 2B:
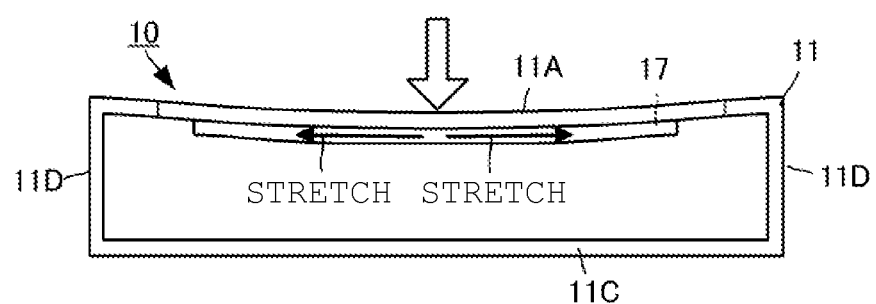
Figure 2C:
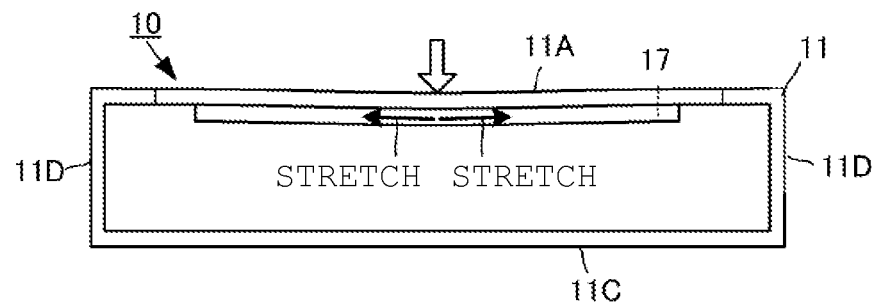

FIG. 2(B) is a sectional view schematically illustrating a state where the cover glass 11A is pressed by a great force, and FIG. 2(C) is a sectional view schematically illustrating a state where the cover glass 11A is pressed by a small force. The pressing sensor 17 is configured to be coupled to the cover glass 11A of the exterior 11 (and the capacitive sensor 13 and the display unit 14 which are not illustrated), and to be deflected together with the cover glass 11A. Hence, the pressing sensor 17 is deformed stretching in a longitudinal direction when the cover glass 11A is pressed. When the pressing force on the cover glass 11A is high, a deformation amount of the pressing sensor 17 is large, and, when the pressing force of the cover glass 11A is low, the deformation amount of the pressing sensor 17 is small. When the deformation amount of the pressing sensor 17 changes, a polarized state of the pressing sensor 17 changes, so that a potential difference is produced between the press detecting electrodes provided on the both principal surfaces of the pressing sensor 17. Consequently, the electronic device 10 can detect deformation of the exterior 11 (a press on the cover glass 11A) based on a potential difference produced between the press detecting electrodes of this pressing sensor 17.

Figure 3:
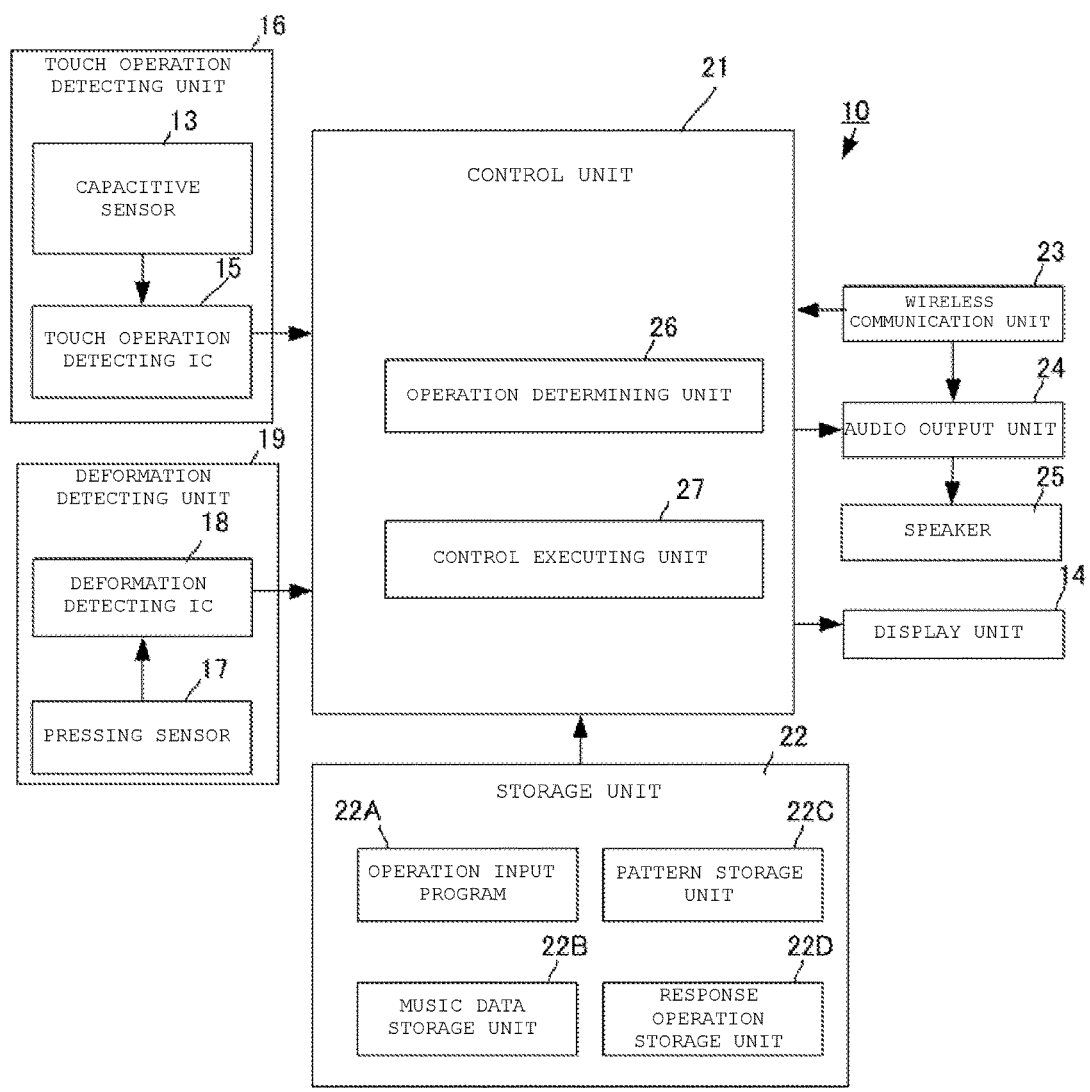
FIG. 3 is a functional block diagram of the electronic device according to the first embodiment of the present invention.

FIG. 3 is a functional block diagram of the electronic device 10.

As shown, the electronic device 10 includes the display unit 14, a touch operation detecting unit 16, a deformation detecting unit 19, a control unit 21, a storage unit 22, a wireless communication unit 23, an audio output unit 24 and a speaker 25.

The touch operation detecting unit 16 detects a touch operation with respect to the cover glass 11A, based on a change in a capacitance of the capacitive sensor 13, and includes a touch operation detecting IC 15 and the above-described capacitive sensor 13. The touch operation detecting IC 15 generates a detection signal related to whether or not a touch operation is performed and coordinate information of the touch operation based on an output of the capacitive sensor 13, and outputs the detection signal to the control unit 21.

The deformation detecting unit 19 detects a press of the finger or the like on the cover glass 11A based on a change in electric charges of the pressing sensor 17, and includes a deformation detecting IC 18 and the above-described pressing sensor 17. The deformation detecting IC 18 generates a detection signal proportional to a pressing force applied to the cover glass 11A, i.e., a detection signal proportional to a deformation amount of the cover glass 11A or the pressing sensor 17, based on an output of the pressing sensor 17, and outputs the detection signal to the control unit 21.

Figures 4A, 4B:
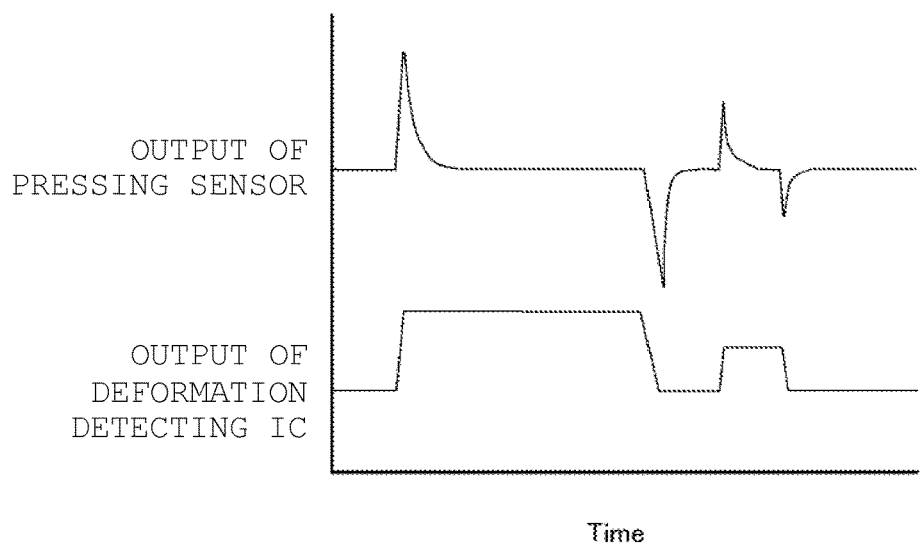
FIG. 4(A) is a graph illustrating a relationship between an output of a pressing sensor of the electronic device according to the first embodiment of the present invention, and an output of a deformation detecting IC.
FIG. 4(B) is a table illustrating a correspondence relationship between deformation patterns of an exterior and response operations of each function mode stored in a storage unit of the electronic device according to the first embodiment of the present invention.

Hereinafter, an output of the pressing sensor 17 and an output of the deformation detecting IC 18 will be described. FIG. 4(A) is a graph illustrating a relationship between the output of the pressing sensor 17 and an output of the deformation detecting IC 18 (a deformation amount of the pressing sensor 17).

Outputs of the pressing sensor 17 are voltage signals obtained by electric charges produced on the both principal surfaces of the piezoelectric film from press detecting electrodes provided on the both principal surfaces of the piezoelectric film. The voltage signals are generally each produced at a peak amplitude level corresponding to a change level of the deformation amount of the pressing sensor 17 at a moment at which the deformation amount of the pressing sensor 17 has changed, and the electric charges leak as a result of a piezoelectric effect and an amplitude level rapidly lowers. A polarity of a voltage to be produced becomes reverse between a moment at which the cover glass 11A is pushed and a moment at which the push of the cover glass 11A is released.

The deformation detecting IC 18 outputs a voltage signal which reflects a temporal change of the deformation amount of the pressing sensor 17 based on the output of the pressing sensor 17. Hence, the deformation detecting IC 18 detects an output of the pressing sensor 17 (peak amplitude level) at a moment at which the deformation amount of the pressing sensor 17 has changed, generates a square wave signal for maintaining a fixed amplitude level proportional to the peak amplitude level, and outputs the square wave signal to the control unit 21. In addition, to more securely detect the peak amplitude level of the pressing sensor 17, it is effective that the deformation detecting IC 18 slows a decrease speed of the amplitude level by using a detection circuit having a high input impedance or increases a sampling rate for sampling an output of the pressing sensor 17.

Further, the control unit 21 illustrated in FIG. 3 is a functional block serving as a collective of an operating system and application executed by a CPU (not illustrated) or the like included as hardware in the electronic device 10. The control unit 21 controls each unit by selecting a function mode to execute, from a plurality of function modes including a music control mode of controlling playback of music data, and a communication control mode of controlling wireless communication.

The wireless communication unit 23 is part of the function unit according to the exemplary embodiment, and executes a function related to transmission and reception of wireless communication signals in the communication control mode. The audio output unit 24 and the speaker 25 are also part of the function unit according to the exemplary embodiment, and execute functions related to sound emission of an audio signal in each function mode. The display unit 14 is also part of the function unit according to the exemplary embodiment, and executes a function related to drawing of an image signal in each function mode. In addition, according to the exemplary embodiment, the touch operation detecting unit 16 is also part of the function unit and executes a function of detecting a touch operation in each function mode.

Further, the control unit 21 includes an operation determining unit 26 and a control executing unit 27 which perform control corresponding to a user's pressing operation. In an exemplary embodiment, the CPU of the control unit 21 discussed above includes the operation determining unit 26 and the control executing unit 27. The operation determining unit 26 detects a user's pressing operation of pressing the cover glass 11A according to a predetermined pattern, from the output of the deformation detecting unit 19. The control executing unit 27 controls the function unit including the wireless communication unit 23, the audio output unit 24, the speaker 25, the display unit 14 and the like to perform a response operation corresponding to the pressing operation detected by the operation determining unit 26. In addition, the control executing unit 27 may perform both the control based on the pressing operation and the control based on the touch operation. In this regard, the control based on the touch operation is generally performed conventionally, and therefore the control based on the touch operation will not be described in detail below.

Further, the storage unit 22 (i.e., electronic memory) is provided to store data used for each function mode, and includes an operation input program 22A, a music data storage unit 22B, a pattern storage unit 22C and a response operation storage unit 22D.

The operation input program 22A is read and executed by the CPU (not illustrated) to cause the control unit 21 to perform the control based on a user's pressing operation. The music data storage unit 22B stores music data used in the above-described music control mode, and a playlist in which an order to play back music data is registered. The pattern storage unit 22C stores a list of predetermined operation patterns related to deformations of the exterior 11. The response operation storage unit 22D stores a list of response operations of each function mode. Each response operation of each function mode stored in the response operation storage unit 22D and each operation pattern stored in the pattern storage unit 22C are associated with each other and stored.

FIG. 4(B) is a table illustrating a matrix pattern of a correspondence relationship between response operations of each function mode stored in the response operation storage unit 22D, and operation patterns stored in the pattern storage unit 22C. The operation patterns stored in the pattern storage unit 22C include, for example, a deformation pattern (click pattern) that a press is performed once in a short time in a certain period of time, a deformation pattern (long-time push pattern) that a press continues for a certain period of time or more, a deformation pattern (double click pattern) that two presses are repeated in a short time, and variations of each deformation pattern that a strength of the press is distinguished. Function modes stored in the response operation storage unit 22D include, for example, the communication control mode and the music control mode. A response operation is associated with each combination of a function mode and an operation pattern.

Hereinafter, control examples of the electronic device 10 will be described.

Figure 5:
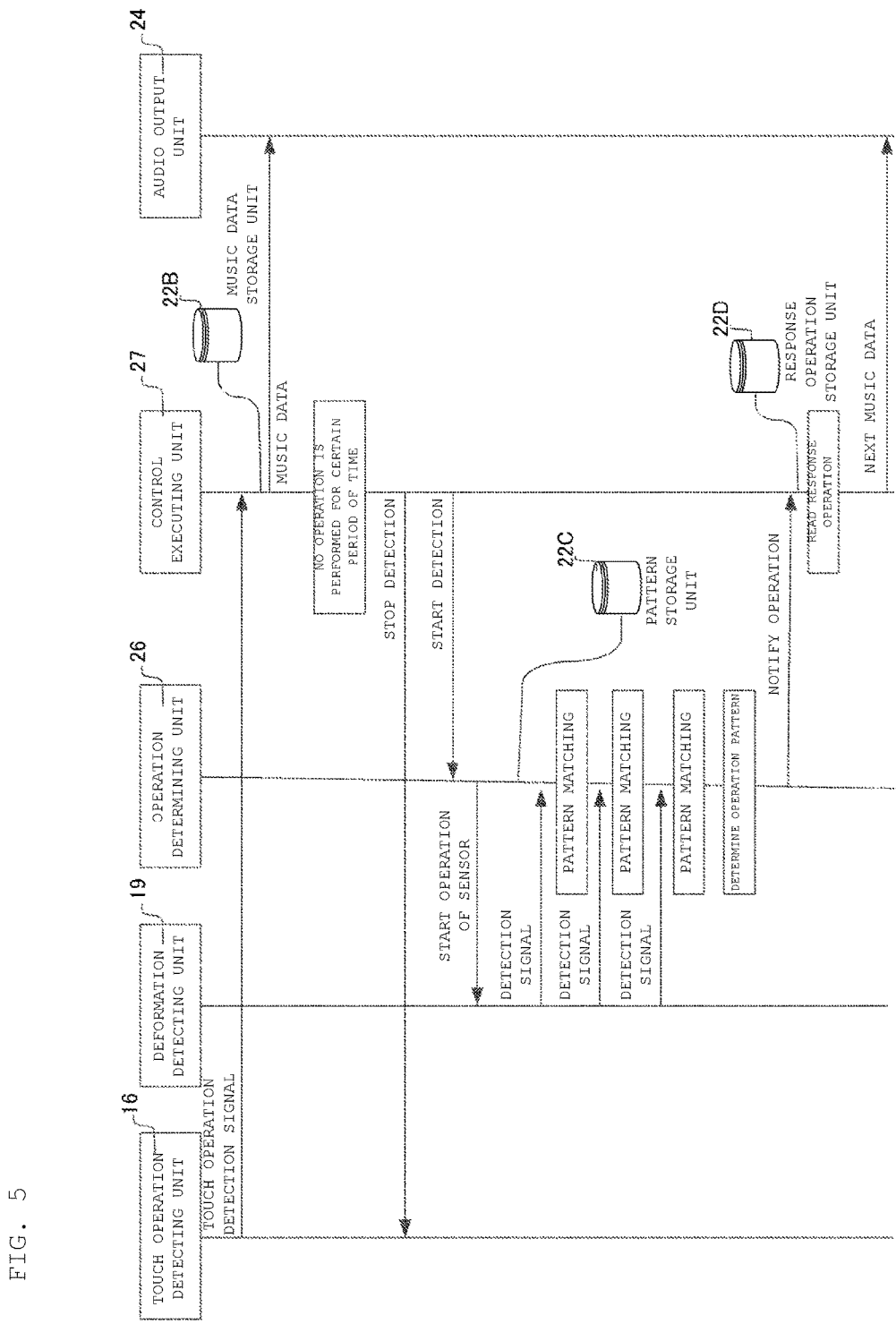
FIG. 5 is a chart illustrating an example of a control flow of a communication control mode of the electronic device according to the first embodiment of the present invention.

FIG. 5 is a block chart illustrating a first control example of the control unit 21. According to the first control example, upon an operation of the electronic device 10 in the music control mode, pressing operation of the cover glass 11A is detected and music data which is being played back is changed to a next track in a playlist in which a playback order of music data is registered in the storage unit 22B.

In the music control mode, the touch operation detecting unit 16 first detects a predetermined touch operation and outputs a detection signal to the control executing unit 27, and then the control executing unit 27 starts music playback processing. Thus, for example, music data is read from the music data storage unit 22B according to the playlist registered in advance, and the control executing unit 27 outputs the music data and a control signal for starting music playback, to the audio output unit 24. The audio output unit 24 outputs an audio signal to the speaker or earphones based on the inputted music data, and plays back the music from the speaker or the earphone.

Further, the control executing unit 27 outputs a control signal to stop operations of the display unit 14 and the touch operation detecting unit 16 when a certain period of time passes after a detection signal is inputted the last time from the touch operation detecting unit 16. Thus, the display unit 14 stops drawing an image, and the touch operation detecting unit 16 stops detecting a touch operation.

Further, the control executing unit 27 outputs control signals for starting detection of a pressing operation, to the operation determining unit 26 and the deformation detecting unit 19 under conditions that control signals for stopping operations of the display unit 14 and the touch operation detecting unit 16 are outputted. The operation determining unit 26 and the deformation detecting unit 19 have been in pause states so far, are activated in response to an input of the control signals from the operation determining unit 26 and start detecting the pressing operation.

In this state, when the user performs a pressing operation on the cover glass 11A, the deformation detecting unit 19 detects a pressing force applied to the cover glass 11A, and outputs a detection signal to the operation determining unit 26. The operation determining unit 26 extracts a deformation pattern of the cover glass 11A based on the detection signal inputted from the deformation detecting unit 19, and determines by way of pattern matching whether or not the operation pattern corresponds to an operation pattern (e.g., a click pattern) registered in the pattern storage unit 22C. When determining that the operation pattern corresponds to the operation pattern registered in the pattern storage unit 22C, the operation determining unit 26 notifies the control executing unit 27 of the operation pattern specified by the pattern matching.

When notified of the detected operation pattern from the operation determining unit 26, the control executing unit 27 reads a response operation of the communication control mode associated with this operation pattern and stored in the response operation storage unit 22D. In this regard, the response operations of the communication control mode include, for example, a response operation (music skipping operation) of changing music data to playback, to music data corresponding to a next track in the playlist, a response operation (volume changing operation) of changing a playback volume of the music data to play back, and a response operation (temporary stop operation) of temporarily stopping playback of music data.

Further, the control executing unit 27 outputs a control signal corresponding to a response operation read from the response operation storage unit 22D, to the audio output unit 24 and the like, and controls an operation state of the audio output unit 24 and the like. When the response operation read from the response operation storage unit 22D is the music skipping operation, the control executing unit 27 outputs music data corresponding to a next track in the playlist, and a control signal for instructing skipping of music of music data, to the audio output unit 24. Thus, the audio output unit 24 outputs an audio signal to the speaker or the earphones based on the inputted music data of the next track, and plays back the music from the speaker or the earphone.

Thus, when the electronic device 10 controls an operation state of the music control mode based on a pressing operation, for example, the user can control music playback by performing a pressing operation while the electronic device 10 which plays back music is in a pocket or a bag.

In this first control example, when the touch operation is enabled, detection of a pressing operation is disabled, and, when the touch operation is disabled, detection of a pressing operation is enabled. That is, a touch operation and a pressing operation are exclusively detected. Consequently, it is possible to prevent a response operation corresponding to a touch operation and a response operation corresponding to a pressing operation from being selected by mistake when the user performs the touch operation or the pressing operation, and to increase the degree of certainty that the response operation is performed as the user intends.

In addition, in a function mode other than the music control mode, a touch operation and a pressing operation may be exclusively detected according to an exemplary embodiment. Further, both of a touch operation and a pressing operation may be temporarily detected. When both of a touch operation and a pressing operation are detected, a response operation is set per combination of a pattern of the pressing operation and a position of the touch operation to perform the response operation corresponding to each combination of the pattern of the pressing operation and the position of the touch operation to be detected.

Next, a second control example where detection of a pressing operation is enabled or disabled according to a function mode in the control unit 21 will be described.

Figure 6:
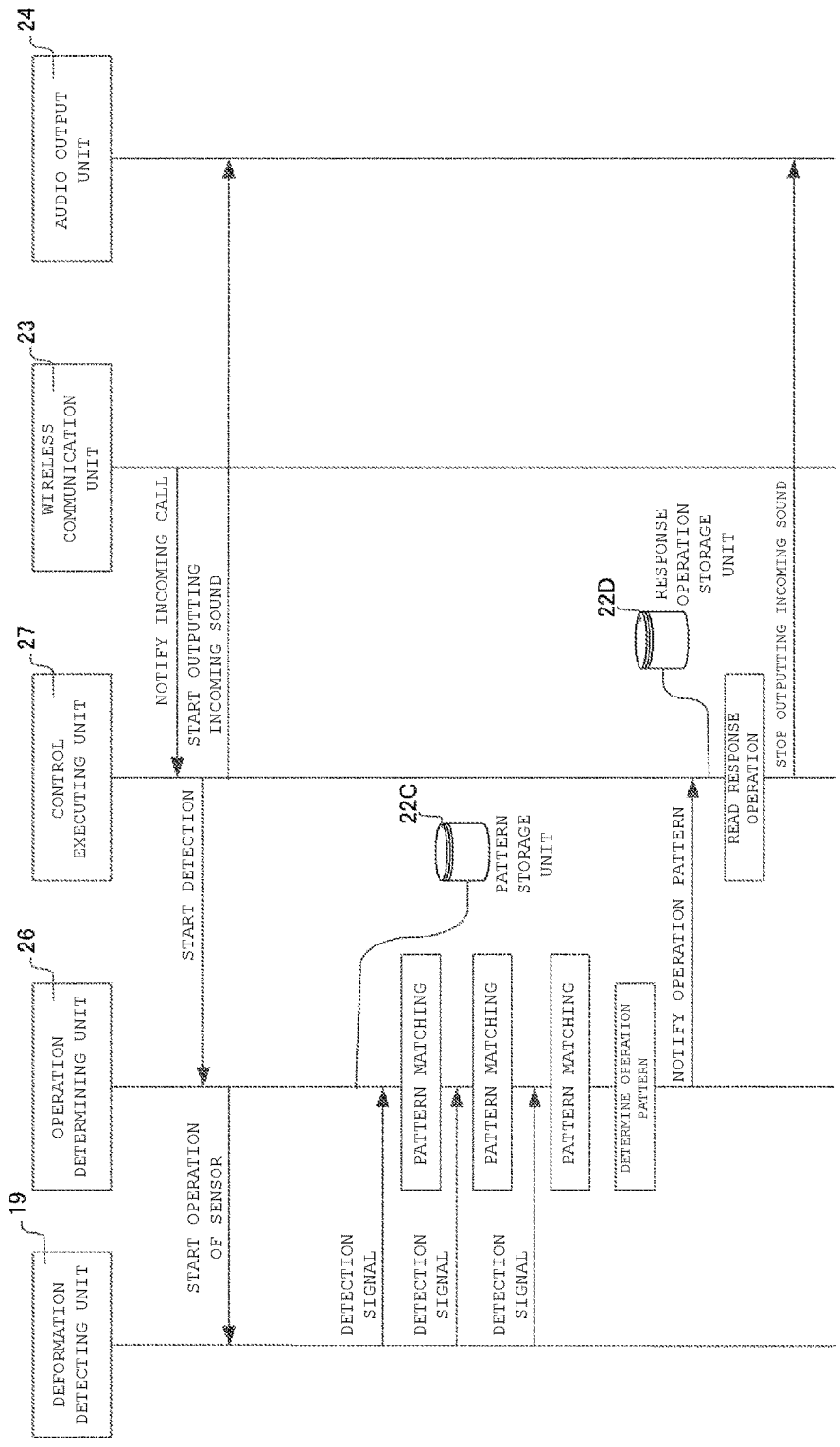
FIG. 6 is a chart illustrating an example of a control flow of a music control mode of the electronic device according to the first embodiment of the present invention.

FIG. 6 is a block chart illustrating the second control example of the control unit 21. In the second control example, upon an operation of the electronic device 10 in the communication control mode (upon playback of an incoming sound), a pressing operation with respect to the cover glass 11A is detected to stop playback of the incoming sound.

When the wireless communication unit 23 outputs an incoming call notification signal to the control executing unit 27 in response to reception of a radio signal, the control executing unit 27 starts an operation in the communication control mode.

In the communication control mode, the control executing unit 27 first outputs a control signal for causing the operation determining unit 26 and the deformation detecting unit 19 to start detecting a pressing operation. The operation determining unit 26 and the deformation detecting unit 19 have been in pause states so far, are activated in response to an input of the control signals from the operation determining unit 26 and start detecting the pressing operation. Further, the control executing unit 27 outputs a control signal for causing the audio output unit 24 to start playing back an incoming sound. When receiving an input of this control signal, the audio output unit 24 starts playing back the incoming sound.

In this state, when the user performs the pressing operation on the cover glass 11A, the deformation detecting unit 19 detects a pressing force applied to the cover glass 11A, and outputs a detection signal to the operation determining unit 26. The operation determining unit 26 extracts a deformation pattern of the cover glass 11A based on the detection signal inputted from the deformation detecting unit 19, and determines by way of pattern matching whether or not the operation pattern corresponds to an operation pattern (e.g., a click pattern) registered in the pattern storage unit 22C. When determining that the operation pattern corresponds to the operation pattern registered in the pattern storage unit 22C, the operation determining unit 26 notifies the control executing unit 27 of the operation pattern specified by the pattern matching.

When notified of the detected operation pattern from the operation determining unit 26, the control executing unit 27 reads a response operation of the communication control mode associated with this operation pattern and stored in the response operation storage unit 22D. In this regard, the response operations of the communication control mode include, for example, a response operation (i.e., call starting operation) of starting a call, a response operation (i.e., holding operation) of putting a call on hold, and a response operation (manner mode changing operation) of stopping playback of the incoming sound.

Further, the control executing unit 27 outputs a control signal corresponding to the response operation read from the response operation storage unit 22D, to the wireless communication unit 23, the audio output unit 24, the display unit 14 and the like, and controls operation states of the wireless communication unit 23, the audio output unit 24, the display unit 14 and the like. When the response operation read from the response operation storage unit 22D is a manner mode changing operation, the control executing unit 27 outputs to the audio output unit 24 a control signal for forbidding playback of the incoming sound. Thus, the audio output unit 24 stops playback of the incoming sound according to the control signal inputted from the control executing unit 27.

Thus, when the electronic device 10 controls an operation state of the communication control mode based on a pressing operation, even if the user suddenly operates the electronic device to stop sudden ringing of the electronic device 10, the user can cut the need to check an operation position of the electronic device 10 and quickly operate the electronic device.

In this second control example, whether to enable or disable detection of a pressing operation is switched according to the function mode. Consequently, when the user can learn an operating function mode, the user can easily determine whether or not the pressing operation is enabled.

In addition, in other function modes of the communication control mode, too, whether to enable or disable detection of a pressing operation may be switched according to a function mode. Further, the first control example and the second control example may be combined to enable exclusive detection of a touch operation and a pressing operation in a predetermined function mode, and to switch whether to enable or disable detection of a pressing operation according to a function mode in the other function modes.

As described above, in the electronic device 10 according to the present embodiment, the deformation detecting unit 19 and the operation determining unit 26 detect that the exterior 11 (cover glass 11A) is deformed according to a predetermined pattern by an external force applied from the user, and the control executing unit 27 controls function units such as the audio output unit 24 and the display unit 14 to perform a response operation per function mode such as the communication control mode and the music control mode. Consequently, the user can operate the electronic device 10 by applying an external force to an arbitrary position of the exterior 11 (cover glass 11A) without checking an operation position. Even though the exterior 11 (cover glass 11A) is deformed by the external force intentionally applied from the user, the exterior is not deformed by an acceleration or an angular velocity, so that it is possible to accurately detect a user's operation.

In addition, the function modes, the operation patterns and the response operations described in the present embodiment are exemplary function modes, operation patterns and response operations, and function modes, operation patterns and response operations other than the above may be performed. Further, the electronic device 10 is not limited to a smartphone terminal, and may be configured in any way as long as the electronic device 10 includes a component corresponding to the deformation detecting unit 19 and detects a pressing operation. For example, the above-described display unit 14, cover glass 11A, touch operation detecting unit 16 and the like are not indispensable components, and the present invention may be an electronic device which does not include these components.

Further, an example where the pressing sensor 17 is formed by the piezoelectric film made of chiral polymers has been described. However, it is also possible to use other piezoelectric materials having pyroelectricity by using in combination a circuit which compensates for pyroelectricity.

Next, an electronic device according to a second embodiment of the present invention will be described.

Figure 7A:
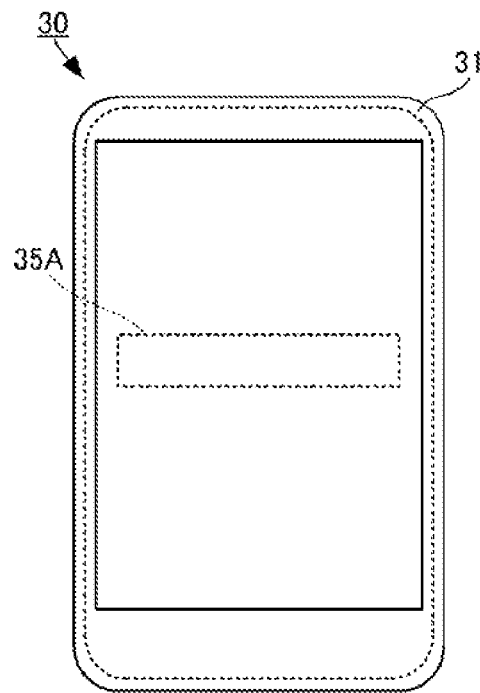
FIGS. 7(A) and 7(B) are a plan view and a side view of an electronic device according to a second embodiment of the present invention.

FIG. 7(A) is a plan view of the electronic device according to the second embodiment of the present invention.

Figure 7B:
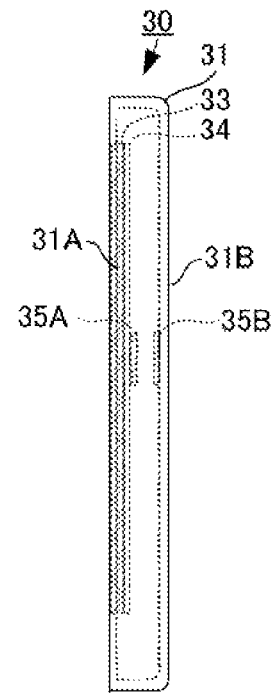

FIG. 7(B) is a side view of the electronic device according to the second embodiment of the present invention.

The electronic device 30 includes an exterior 31, a capacitive sensor 33, a display unit 34 and pressing sensors 35A and 35B. The exterior 31 has a rectangular flat shape, includes an internal space and includes a cover glass 31A and a back plate 31B. The capacitive sensor 33, the display unit 34 and the pressing sensor 35A are provided to a back surface side of the cover glass 31A. The pressing sensor 35B is provided to a front surface of the back plate 31B. The pressing sensors 35A and 35B deform in response to a push of the cover glass 31A or the back plate 31B by a user's finger. The other components such as a control unit of the electronic device 30 are the same as those of the electronic device according to the first embodiment.

Thus, the electronic device 30 according to the present embodiment detects that the cover glass 31A or the back plate 31B of the exterior 31 is deformed according to a predetermined pattern by an external force applied from the user, and performs a response operation corresponding to this pressing operation. Consequently, the user can operate the electronic device 30 by applying an external force to an arbitrary position of the cover glass 31A or the back plate 31B of the exterior 31 without checking an operation position. Consequently, for example, the user can cut the need to learn a top and a back of the electronic device 30, and more quickly perform a pressing operation.

Figure 8A:
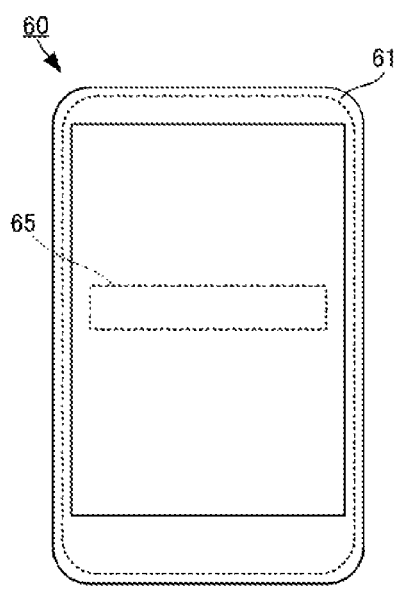
FIGS. 8(A) and 8(B) are a plan view and a side view of an electronic device according to a third embodiment of the present invention.
Figure 8B:
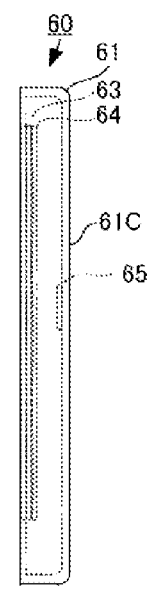

Next, an electronic device according to a third embodiment of the present invention will be described. FIG. 8(A) is a plan view of the electronic device according to the third embodiment of the present invention. FIG. 8(B) is a side view of the electronic device according to the third embodiment of the present invention.

An electronic device 60 according to the third embodiment includes an exterior 61, a capacitive sensor 63 and a display unit 64 similar to the first embodiment. In this regard, in the electronic device 60, a pressing sensor is not provided to the capacitive sensor 63 and the display unit 64, and a pressing sensor 65 is provided to a back plate 61C of the exterior 61.

The pressing sensor 65 may be provided to the exterior 61 as described above, and, in this case, too, a user can operate the electronic device 60 by applying an external force to an arbitrary position of the back plate 61C of the exterior 61 without checking an operation position.

Figure 9A:
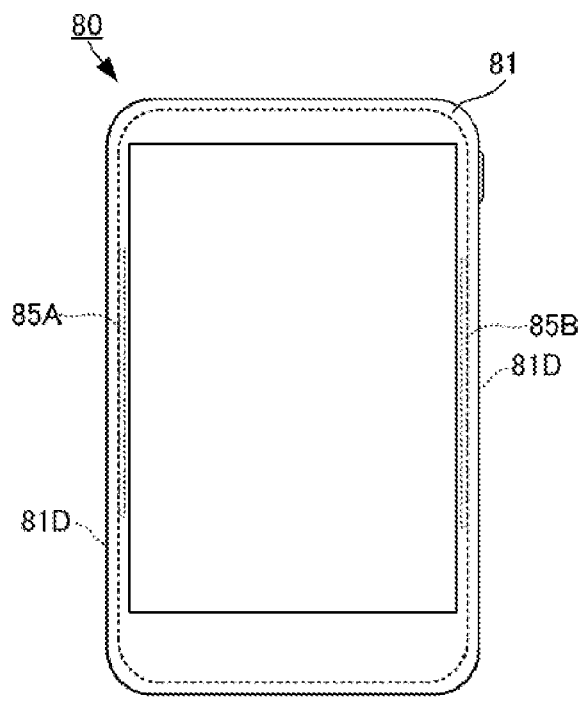
FIGS. 9(A) and 9(B) are a plan view and a side view of an electronic device according to a fourth embodiment of the present invention.
Figure 9B:
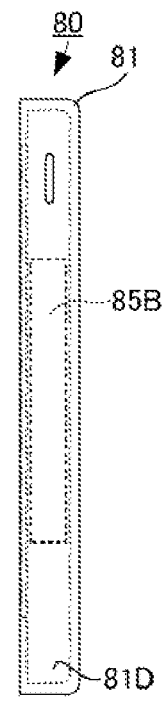

Next, an electronic device according to a fourth embodiment of the present invention will be described. FIG. 9(A) is a plan view of the electronic device according to the fourth embodiment of the present invention. FIG. 9(B) is a side view of the electronic device according to the fourth embodiment of the present invention.

An electronic device 80 according to the fourth embodiment is a smartphone terminal including an exterior 81, a display unit (not illustrated) and a capacitive sensor (not illustrated) similar to the first embodiment. In this regard, in the electronic device 80, a pressing sensor is not provided to the display unit and the capacitive sensor, and pressing sensors 85A and 85B are provided to a pair of opposing side plates 81D of the exterior 81.

The pressing sensors 85A and 85B may be provided to the exterior 81 as described above, and, in this case, too, a user can operate the electronic device 80 by applying an external force to an arbitrary position of the side plates 81D of the exterior 81 without checking an operation position.

As described above in each embodiment, the present invention may detect any deformation of an exterior as long as the present invention is an electronic device which detects an operation by using a deformation detecting unit which detects deformation of the exterior.

DESCRIPTION OF REFERENCE SYMBOLS 10,30,60,80 ELECTRONIC DEVICE
11,31,61,81 EXTERIOR
11A COVER GLASS
12 TOUCH PANEL
13 CAPACITIVE SENSOR
14 DISPLAY UNIT
15 TOUCH OPERATION DETECTING IC
16 TOUCH OPERATION DETECTING UNIT
17, 35A, 35B, 65, 85A, 85B PRESSING SENSOR
18 DEFORMATION DETECTING IC
19 DEFORMATION DETECTING UNIT
21 CONTROL UNIT
22 STORAGE UNIT
22A OPERATION INPUT PROGRAM
22B MUSIC DATA STORAGE UNIT
22C PATTERN STORAGE UNIT
22D RESPONSE OPERATION STORAGE UNIT
23 WIRELESS COMMUNICATION UNIT
24 AUDIO OUTPUT UNIT
25 SPEAKER
26 OPERATION DETERMINING UNIT
27 CONTROL EXECUTING UNIT
90 HAND
91 FINGER

The invention claimed is:

1. An electronic device configured to operate in a plurality of function modes, the electronic device comprising:
   a function unit configured to execute a function corresponding to a selected function mode;
   an exterior housing that deforms upon receiving an external force;
   a touch sensor for detecting a touch operation applied to the exterior housing and generating a touch output signal as a function thereof;
   a deformation sensor for detecting a deformation of the exterior housing and generating a deformation output signal as a function thereof;
   a storage unit that stores a correspondence relationship between deformation patterns of the exterior housing indicated by the deformation output signal and respective response operations; and
   a controller configured to:
      control operation of the electronic device as a function of the touch output and deformation output signals;
      disable the touch sensor when the deformation sensor is enabled and disable the deformation sensor when the touch sensor is enabled;
      identify a deformation pattern stored in the storage unit based on the detected deformation of the exterior housing as indicated by the deformation output signal,
      determine the response operation corresponding to the identified deformation pattern and the selected function mode, and
      control an operation state of the function unit based on the determined response operation.

2. The electronic device according to claim 1, wherein the controller is configured to control the deformation sensor to enter an activation state from a pause state when the function unit enters a predetermined operation state.

3. The electronic device according to claim 2, wherein the touch sensor comprises a capacitive sensor and integrated circuit configured to detect a touch operation of a user on an operation surface of the exterior housing.

4. The electronic device according to claim 3, wherein the controller is configured to control the deformation sensor to enter the activation state from the pause state when the touch sensor enters a pause state.

5. The electronic device according to claim 4, wherein the touch sensor is configured to enter the pause state after a period of time passes after detecting the touch operation.

6. The electronic device according to claim 2, wherein:
the plurality of function modes includes a communication control mode;
the function unit includes a wireless communication unit configured to communicate wirelessly in the communication control mode; and
the controller is configured to control the deformation sensor to enter the activation state from the pause state when the wireless communication unit receives a wireless signal.

7. The electronic device according to claim 1, wherein the deformation sensor includes a piezoelectric film that deforms in response to a pressing force applied to the exterior housing.

8. The electronic device according to claim 7, wherein the piezoelectric film comprises a chiral polymer.

9. The electronic device according to any one of claim 1, wherein the exterior housing has a rectangular flat shape and the deformation sensor detects deformation of each of opposing outer surfaces of the exterior housing.

10. A non-transitory memory storing an operation input program to be executed by an electronic device that comprises:
a function unit configured to execute a function corresponding to a function mode selected from a plurality of function modes;
an exterior housing that deforms upon application of an external force;
a touch sensor for detecting a touch operation applied to the exterior housing and generating a touch output signal as a function thereof;
a deformation sensor for detecting a deformation of the exterior housing and generating a deformation outputs signal as a function thereof; and
a storage unit that stores a correspondence relationship between deformation patterns of the exterior housing indicated by the deformation output signal and respective response operations,
wherein the operation input program, when executed by a processor of the electronic device, is configured to:
control operation of the electronic device as a function of the touch output and deformation output signals;
disable the touch sensor when the deformation sense is enabled and disable the deformation sensor when the touch sensor is enabled;
identify a deformation pattern stored in the storage unit based on the detected deformation of the exterior housing as indicated by the deformation output signal,
determine the response operation corresponding to the identified deformation pattern and the selected function mode, and
control an operation state of the function unit based on the determined response operation.

11. The operation input program according to claim 10, wherein the operation input program, when executed by the processor of the electronic device, is further configured to control the deformation sensor to enter an activation state from a pause state when the function unit enters a predetermined operation state.

12. The operation input program according to claim 11, wherein the touch sensor comprises a capacitive sensor and integrated circuit configured to detect a touch operation of a user on an operation surface of the exterior housing.

13. The operation input program according to claim 12, wherein the operation input program, when executed by the processor of the electronic device, is further configured to control the deformation sensor to enter the activation state from the pause state when the touch sensor enters a pause state.

14. The operation input program according to claim 13, wherein the operation input program, when executed by the processor of the electronic device, is further configured to control the touch sensor to enter the pause state after a period of time passes after detecting the touch operation.

15. A method for controlling a functional unit of an electronic device that is configured to execute a function corresponding to a selected function mode of a plurality of function modes, the method comprising:
using a touch sensor to detect a touch operation applied to the exterior housing and generate a touch output signal as a function thereof;
using a deformation sensor to detect a deformation of an exterior housing of the electronic device and generating a deformation output signal as a function thereof;
storing a correspondence relationship between deformation patterns of the exterior housing as indicated by the deformation output signal and respective response operations;
using a controller to:
control operation of the electronic device as a function of the touch output and deformation output signals;
disable the touch sensor when the deformation sensor is enabled and disable the deformation sensor when the touch sensor is enabled;
identify a deformation pattern stored based on the detected deformation of the exterior housing as indicated by the deformation output signal;
determine the response operation corresponding to the identified deformation pattern and the selected function mode; and
control an operation state of the function unit based on the determined response operation.

16. The method according to claim 15, further comprising using the controller to control the deformation sensor to enter an activation state from a pause state when the function unit enters a predetermined operation state.

17. The method according to claim 16, further comprising using the touch detector to detect a touch operation of a user on an operation surface of the exterior housing.

18. The method according to claim 17, further comprising using the controller to control the deformation sensor to enter the activation state from the pause state when the touch detector enters a pause state.

19. The method according to claim 18, further comprising using the controller to cause the touch sensor to enter the pause state after a period of time passes after detecting the touch operation.

20. The method according to claim 16, wherein the plurality of function modes includes a communication control mode and the function unit includes a wireless communication unit configured to wirelessly communicate in the communication control mode, the method further comprising using the controller to control the deformation sensor to enter the activation state from the pause state when the wireless communication unit receives a wireless signal.

* * * * *